US010447752B2

(12) United States Patent
McClure

(10) Patent No.: US 10,447,752 B2
(45) Date of Patent: Oct. 15, 2019

(54) LIVE MIGRATION OF VIRTUALIZED VIDEO STREAM DECODING

(71) Applicant: VMware, Inc., Palo Alto, CA (US)

(72) Inventor: Matthew D. McClure, Oakland, CA (US)

(73) Assignee: VMware, Inc., Palo Alto, CA (US)

(*) Notice: Subject to any disclaimer, the term of this patent is extended or adjusted under 35 U.S.C. 154(b) by 233 days.

(21) Appl. No.: 15/359,613

(22) Filed: Nov. 22, 2016

(65) Prior Publication Data

US 2018/0146020 A1    May 24, 2018

(51) Int. Cl.
G06F 9/455 (2018.01)
H04L 29/06 (2006.01)
H04N 19/172 (2014.01)
H04N 19/176 (2014.01)
H04N 19/503 (2014.01)
H04N 19/44 (2014.01)
H04N 19/423 (2014.01)
H04N 19/40 (2014.01)

(52) U.S. Cl.
CPC ........ H04L 65/602 (2013.01); G06F 9/45558 (2013.01); H04L 65/4069 (2013.01); H04L 65/605 (2013.01); H04N 19/172 (2014.11); H04N 19/176 (2014.11); H04N 19/423 (2014.11); H04N 19/44 (2014.11); H04N 19/503 (2014.11); G06F 2009/4557 (2013.01); G06F 2009/45575 (2013.01); G06F 2009/45583 (2013.01); G06F 2009/45595 (2013.01); H04N 19/40 (2014.11)

(58) Field of Classification Search
CPC . H04L 65/602; H04L 65/4069; H04N 19/172; H04N 19/176; G06F 9/45558
See application file for complete search history.

(56) References Cited

U.S. PATENT DOCUMENTS

| 2009/0160865 | A1* | 6/2009 | Grossman | H04N 9/87 345/502 |
| 2009/0323821 | A1* | 12/2009 | Sugimoto | H04N 19/44 375/240.25 |
| 2016/0247248 | A1* | 8/2016 | Ha | G06F 9/455 |
| 2016/0299773 | A1* | 10/2016 | Dong | G06F 9/45558 |
| 2017/0070572 | A1* | 3/2017 | Anan | G06F 9/50 |

(Continued)

OTHER PUBLICATIONS

Shimpi, Anand Lal, "NVIDIA GeForce 8600: Full H.264 Decode Acceleration", Apr. 27, 2007, http://www.anandtech.com/show/2220/5, 5 pages.

(Continued)

Primary Examiner — James J Lee

(57) ABSTRACT

Embodiments perform live migration of a virtual machine (VM) decoding a video stream including suspending and resuming the video stream. A software decoder operating on the VM is able to use dedicated video decoding hardware resources of the host computing device upon which the VM is operating. Upon receipt of a suspension or live migration request, the VM completes any decode operations for a pending video frame before storing video decode state to shared memory. After migration to another VM, a transcoder extracts the video decode state and a software decoder resumes decoding of the video stream.

20 Claims, 10 Drawing Sheets

(56) References Cited

U.S. PATENT DOCUMENTS

2017/0132747 A1* 5/2017 Wilt .................. G06T 1/20

OTHER PUBLICATIONS

Sullivan, Gary J., "DirectX Video Acceleration Specification for H.264/AVC Decoding", Microsoft Corporation, Dec. 2010, 72 pages.
Richardson, "The H.264 Advanced Video Compression Standard, Second Edition", John Wiley & Sons, 2010, 348 pages.
Tourapis et al., "H.264/14496-10 AVC Reference Software Manual", Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 90 pages.
Richardson, "H.264 / AVC Picture Management", Vcodex, captured Jul. 21, 2016, http://www.staroceans.org/ebook/vcodex/H264_picmanagement_wp.pdf, 2011, 9 pages.
Unknown, "ITU-T Recommendation H.264.2 : Reference software for H.264 advanced video coding", International Telecommunications Union, Feb. 2016, 12 pages.
Ohm et al., "Advanced Video Coding", Jul. 2005, http://mpeg.chiariglione.org/standards/mpeg-4/advanced-video-coding, 10 pages.

\* cited by examiner

LIVE MIGRATION OF VIRTUALIZED VIDEO STREAM DECODING

BACKGROUND

Some existing computing systems leverage various video coding standards to provide good video quality at lower bit rates than traditional video coding standards. These standards are also utilized by virtual machines (VMs) to present video content to users in a virtualized environment. Some of these systems rely on dividing a video stream into individual video frames, which are further subdivided into slices, then into macroblocks. While the macroblocks can be further divided, some widely used video coding standards leverage similarities between macroblocks identified across multiple video frames. In these examples, instead of maintaining and decoding information for each discrete video frame, variances between the identified similar macroblocks are tracked and utilized to decode other video frames, relying on the commonality between the macroblocks. The variance data, which includes information such as motion vectors, picture order counters, and other macroblock data, comprises a state or video decode state of each macroblock. In some examples, the video decode state includes picture buffer metadata or coding unit metadata.

These current systems permit suspension of a video stream presented to a user at the granularity of a central processing unit (CPU) software decode instruction, when live migrating the video stream from a source VM to a destination VM. But these existing systems, which rely on application programming interfaces (APIs) to access the CPU-based software decoders, frequently hide the internal state of the API, or of each video frame or macroblock from the VM decoding the video stream. The hidden internal state of the API and the hidden video decode state of the frames prohibit the destination VM from most efficiently resuming the decode operations of the video stream.

SUMMARY

One or more embodiments described herein allow for live migration of a video stream from one source virtual machine (VM) to a destination VM. A software decoder operating in the source VM intercepts a request for the migration of the video stream, which is comprised of a plurality of video frames, from the source VM to the destination VM. The source VM completes any pending decode operations for the current video frame, and suspends execution of any new decode operations for subsequent frames. A plurality of video decode states, defined at the time the source VM completes the decode operations, are stored or uploaded in to a picture buffer. The video stream is then migrated to the destination VM, where the video decode state is restored from the picture buffer and the decode operations are resumed on the destination VM.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
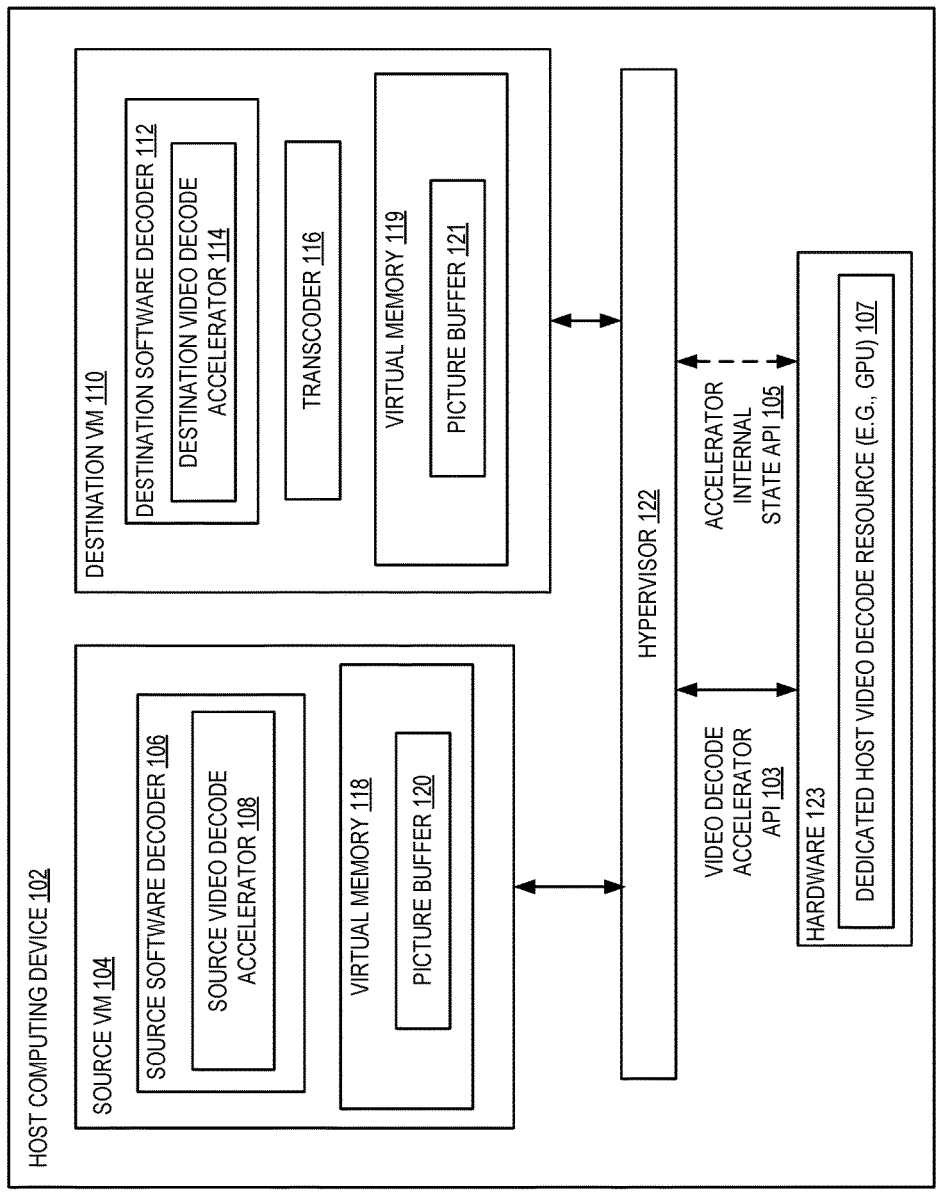
FIG. 1 is a block diagram of an exemplary host computing device for live migration of a video stream from a source virtual machine (VM) to a destination VM.

Embodiments described herein enable use of dedicated hardware for video stream decoding by a virtual machine (VM) while providing support for live migration of that VM with efficient resumption of the video stream decoding. Aspects of the disclosure provide resource consolidation through a Host Video Decode Acceleration application programming interface (API), and provide fault tolerance through live migration technology leveraging shared memory.

By utilizing a host's dedicated video decode resources through a virtualized video decode accelerator, processor usage is reduced. To consolidate resources while maintaining minimal live migration latency, specific video decode state and Host Video Decode Acceleration API state information are saved. The specific state information is saved to guest specific memory at least (1) when a video decode operation is requested and (2) after submitting the pending video decode operations to the Host Video Decode Acceleration API. Saved video decode state includes but is not restricted to current data including: sequence parameter set (SPS), picture parameter set (PPS), picture parameter buffer, picture order count (POC), motion vectors, and host video decode accelerator metadata.

Embodiments use the saved state information to sufficiently restore the destination software decoder state to resume decode of the migrated video stream (assuming a new decoder process instance). Upon resume, the state of the software decoder is restored (e.g., through the Host Video Decode Acceleration API) and any decoded pictures are re-uploaded to a decode picture buffer. Any subsequent encoded picture groups are submitted to the software decoder after the software decoder state is restored. In this manner, the disclosure enables the VM to suspend decoding on one host video decode accelerator and resume decoding on another, thus enabling live migration of the video stream along with its associated VM.

Aspects of the disclosure intelligently interrupt guest operations to enable live migration of the VM decoding a video stream. For example, to reduce the added complexity (e.g., re-processing of portions of the video stream) created by interruption within intra-frame video state, a decode operation for a frame is not interrupted before completion upon receipt of live migration request. The live migration request may come from any existing technology for live migration, such as VMotion by VMware, Inc. VMotion relies upon suspend/resume technology and allows a near-seamless transition of an active virtual machine from one computing device to another.

Further aspects of the disclosure support Temporal Direct Mode and Weighted Prediction for video streams having B-Slices, as further described below.

While some of the embodiments described herein are operable with video encoded according to H.264, other embodiments are operable with other video encoding formats such as H.265.

While some embodiments are described with reference to VMs for clarity of description, the disclosure is operable with any virtual computing instances (VCIs). A virtual computing instance is a VM, a container, or any other type of virtualized computing instance. A host supports a VM, a container, and/or any other virtual computing instance. A host may be implemented as a physical server, or as a cloud instance running within a cloud environment. A cloud instance of a host is a host running within a VM, a container, or other virtual computing instances. This may be implemented as a first hypervisor running within a VM, which is running over a second hypervisor, in some examples. A cloud instance of a host runs within a virtual computing instance, while supporting one or more other computing instances. A VM running within a cloud instance of a host may be referred to as a nested VM.

For example, aspects of the disclosure also apply to a software decoder running in user-space (e.g. containers), such as a decoder instance within user-space for workstation video decode functionality on a host.

FIG. 1 is a block diagram of an exemplary system for live migration of a video stream from a source virtual machine to a destination VM. In the example of FIG. 1, two VMs operate on the host computing device 102. The host computing device 102 is described in more detail in FIGS. 9 and 10. In the illustrated example, the source VM is initially decoding the video stream. The source VM 104 and the destination VM 110 each utilize a software decoder. The source software decoder 106 and the destination software decoder 112 operate on the source VM 104 and the destination VM 110, respectively. Each software decoder includes a video decode accelerator, such as a source video decode accelerator 108 or a destination video decode accelerator 114. The destination software decoder 112 also includes a transcoder 116.

The source VM 104 accesses virtual memory 118 on the host computing device 102. A picture buffer 120 is located on the virtual memory 118. The picture buffer 120 is inside the guest virtual memory 118 managed by a guest operating system on the source VM 104. The picture buffer 120 stores a video decode state for decoded frames of the video stream. The source software decoder 106 also maintains a decoded picture buffer list on the picture buffer 120 as a representation (e.g., reduction) of the previously encoded video stream. An encoded video stream makes reference to the picture buffer 120 to reduce the transmission size. The transmission size is further reduced by sending deltas from existing decoded frames stored or uploaded into the picture buffer 120. For suspend/resume operations, the decoded picture buffer list is explicitly managed to save and restore the contents of the picture buffer 120 and their associated lifetime tags.

A destination software decoder 112 operating on the destination VM 110 includes a destination video decode accelerator 114. The destination VM 110 also includes a transcoder 116, which includes a parser context (illustrated in FIG. 8). The destination VM 110 includes virtual memory 119. A picture buffer 121 is located on the virtual memory 119. The picture buffer 121 is inside the guest virtual memory 119 managed by a guest operating system on the destination VM 110. Data from the picture buffer 120 on the source VM 104 is copied to the memory seen by the guest operating system on the destination VM 110 during live migration.

The source VM 104 and the destination VM 110 are managed by a hypervisor 122. The hypervisor 122 manages hardware 123, such as the dedicated host video decode resource 107 (e.g., GPU). The source VM 104 and the destination VM 110 communicate with the hardware 123 through the hypervisor 122. For example, in response to requests from the source VM 104 and the destination VM 110, the hypervisor 122 communicates with the GPU via a Video Decode Accelerator API 103 and an Accelerator Internal State API 105.

The destination VM 110 receives the video stream from the source VM 104 during live migration. Upon resuming decoding operations, the destination VM 110 leverages the decoded picture buffer list and picture buffer 120 data from the source VM 104 which has been uploaded, restored, populated, or other made available to the destination VM 110 from the source VM 104 to decode subsequent video frames. For example, data from the picture buffer 120 on the source VM 104 is transferred to the picture buffer 121 on the destination VM 110.

The destination software decoder 112 makes a call to the dedicated host video decode resource 107 via a Video Decode Acceleration API 103, requesting that subsequent video frames, divided into macroblocks, are decoded relying on the video frames migrated to the picture buffer 121. The Video Decode Acceleration API 103 executes the requested decode operations by leveraging the dedicated host video decode resource 107, such as a GPU. The video decode states are stored in the picture buffer 121 for use by the destination VM 110.

In some examples, the video frames stored in the picture buffer 120 prior to migration are only partially reconstructed. In those examples, video decode states are either incomplete or are unavailable. As an example, if the source VM 104 did not have an Accelerator Internal State API 105, the internal API state of the Video Decode Acceleration API and the video decode state of the stored video frames or macroblocks on the picture buffer 120 are not exported. In those examples, the source VM 104 cannot access the calculated or implicit state and/or video decode state that is calculated per frame for a video decode accelerator, and thus the state is tracked by a parser context for transmission to the destination VM 110 as part of the live migration.

In these examples the calculated or implicit state, which may include motion vectors, macroblock field flags, and weighted prediction variants, are derived at the destination VM 110 from parser context state saved in the picture buffer. The transcoder 116, or other component, derives this information from the implicit state information transmitted in the absence of explicit state information. The transcoder 116 uses the parser context to derive video decode state data from implicit state information. It has an encoding mechanism to reconstruct the bitstream. The transcoder 116 is divided into a decode process and an encode process. The transcoder 116 is a hybrid of portions of the decode process which are parsed into the parser context (illustrated in FIG. 8). Then the transcoder 116 re-encodes the parsed macroblocks and their associated video decode state data and re-inserts the result into the bitstream for decoding by the destination software decoder 112 operating on the destination VM 110.

Figure 2:
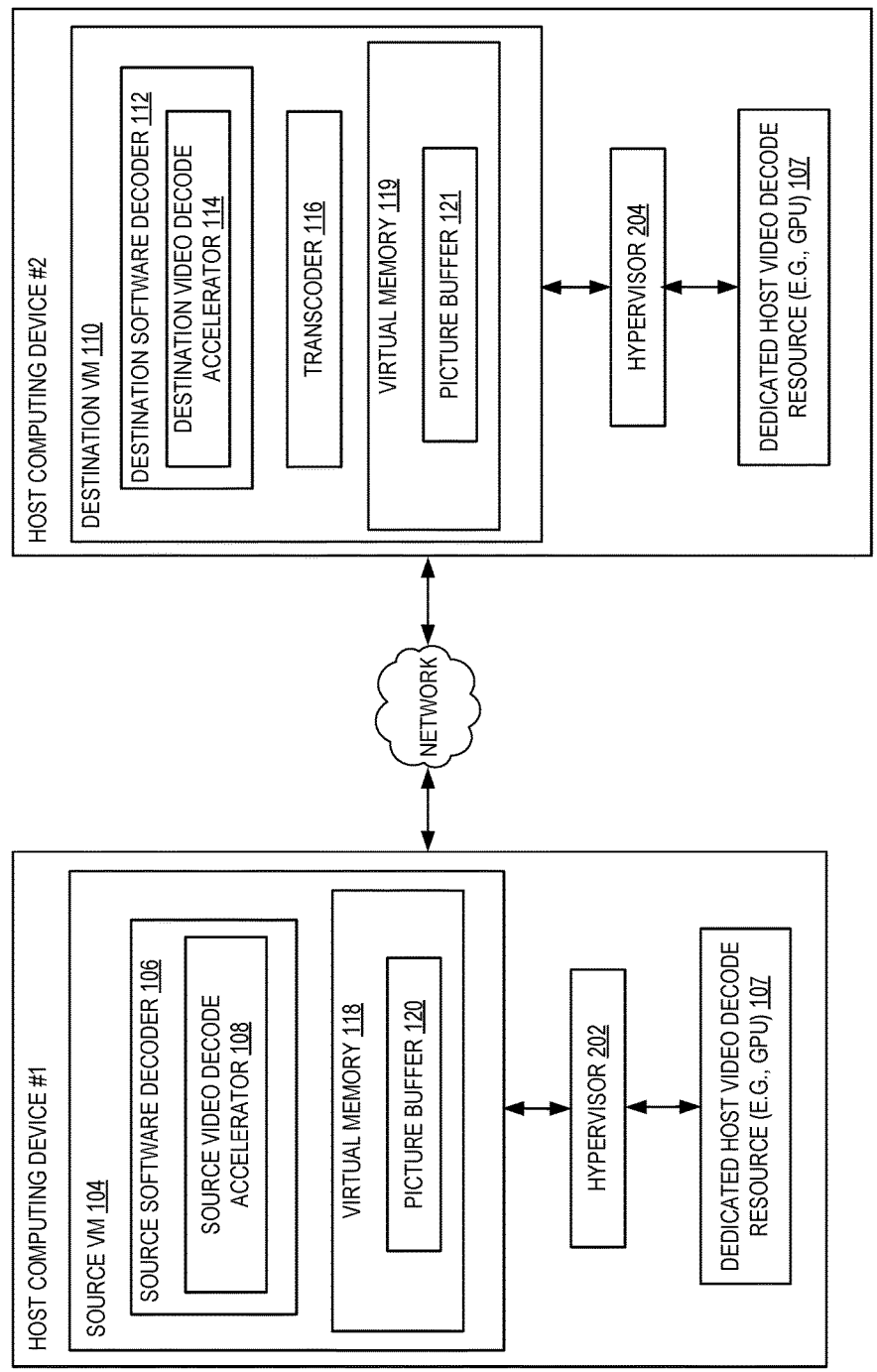
FIG. 2 is a block diagram of live migration of a video stream between two host computing devices.

FIG. 2 is a block diagram of live migration of a video stream between two host computing devices. In this example, the source VM 104 is on a host computing device #1, and the destination VM 110 is on a host computing device #2. The host computing device #1 and the host computing device #2 are connected via a network. In contrast with FIG. 1 which had a single hypervisor communicating with the source VM 104 and the destination VM 110, in FIG. 2 each of the host computing devices has its own hypervisor. Hypervisor 202 manages the source VM 104 and hypervisor 204 manages the destination VM 110.

Figure 3:
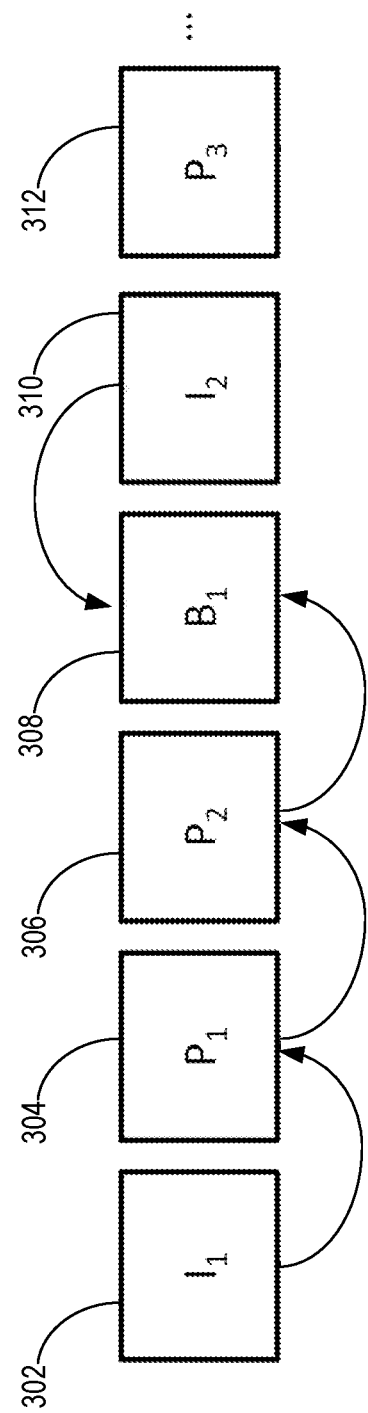
FIG. 3 is a block diagram of a frame sequence showing reference frame contributions.

FIG. 3 is a block diagram of a frame sequence showing reference frame contributions during video stream decoding. Each block represents a macroblock taken from a picture frame. Utilizing the pre-decoded macroblocks, a subsequent macroblock can be derived. FIG. 3 illustrates two classes of prediction: Intra-prediction and Inter-prediction. Intra-prediction evaluates neighboring macroblocks within a given frame. Inter-prediction evaluates macroblocks from previously decoded frames or pictures. I-frames or Intra-frames do not reference other frames for prediction, but rely only on other macroblocks within the same frame. Frames I1 302 and I2 310 are examples of Intra-frames. The P and B frames are examples of Inter-prediction frames which rely upon macroblocks from other frames for reference. Frames P1 304, P2 306, B1 308, and P3 312 are examples of Inter-prediction frames. P and B frames reduce video transmission size, making live streaming video feasible at the expense of a stateful representation for a given frame.

In FIG. 3, if the desired resume frame is P2 306, both I1 302 and P1 304 need to be decoded to create the proper reference frame history. For a video already on local storage, a video player can seek into the file and begin decoding from the latest I-frame before the earliest referenced frame, but in both instances the frame history is constructed through decoding. Neither scenario removes the latency required to recreate the frames between the required I-frame and the desired resume frame, therefore neither is sufficient for the suspend/resume requirements of live migration.

Under the disclosed system, a live streaming video can be recorded onto local storage, and then kept from the beginning of time. This allows resuming decode from either the beginning of the video or the latest I-frame before the earliest referenced frame, without a request to the server for previous content. A new decoder process can begin decoding from the last I-frame as long as there are no referenced frames that were required before the I-frame.

A software decoder within a VM inherits the benefit of resuming under a VM's suspend/resume technology. When a suspend of the VM occurs, the state of the software decoder is saved within working memory of the guest. Subsequently, the working memory is restored upon resuming the VM and the software decoder continues decoding. Suspend in this case occurs at the granularity of virtual CPU (vCPU) instructions.

Figure 4:
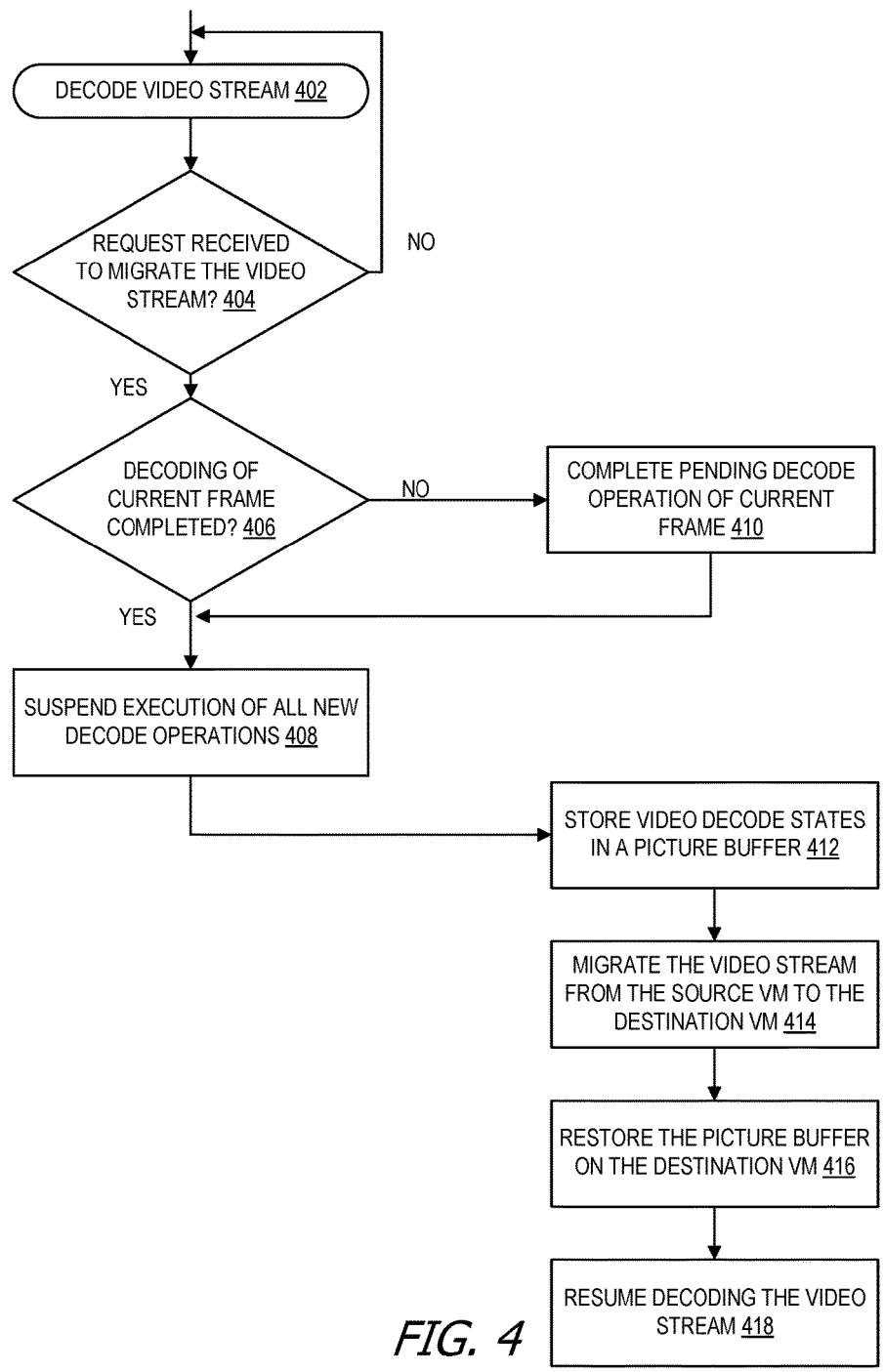
FIG. 4 is a flowchart of an exemplary method of live migration of a video stream from the source VM to the destination VM.

FIG. 4 is a flowchart of an exemplary method of live migration of a video stream from a source VM to a destination VM. At operation 402, the disclosed system is decoding the video stream on a source VM. During the decoding operations, a request is received to live migrate the video stream at operation 404. In some examples the request is not to migrate the video stream, but to suspend the video stream, for resumption at a later time. In some examples the source and destination VMs operate on the same host computing device and share hardware resources such as a GPU and CPU (e.g., as in FIG. 1). Alternatively, the video stream may be migrated from the source VM on one host computing device to the destination VM on another host computing device (e.g., as in FIG. 2).

Alternatively or in addition to suspending the video stream, the video stream may also be paused. In some examples, this includes pausing the video as displayed by a video player, pausing for the migration of a VM performing the decoding, pausing for cloning of a VM performing the decoding, or pausing for any other reason, and then later resuming decoding and/or playback (e.g., unpausing). Pausing or suspending the presentation or decoding of the video stream occurs at the granularity of a virtual processor instruction.

In response to receiving the request, at operation 406 the process evaluates whether the decoding of a current frame of the video stream is complete. Although decode operations may be pending for subsequent frames, the process does not begin execution of any decode operations for any subsequent frames. If the decoding of the current frame of the video stream is incomplete then the pending decode operations of the current frame are completed at operation 410. But if all pending decode operations of the current frame are complete, then the process suspends execution of all new decode operations on subsequent frames at operation 408.

At operation 412 the video decode states are stored in a picture buffer associated with the source VM. The picture buffer is maintained in virtual memory (e.g., virtual memory 118) of the source VM, as illustrated in FIG. 1. In some examples, the video decode state of the frames is not tracked, but an Accelerator Internal State API is utilized which gives state upon request.

At operation 414 the live migration of the video stream occurs from the source VM to the destination VM. The state of the source VM is completely transferred to the destination VM, including associated storage and memory. In some examples where the source VM and the destination VM operate on the same host computing device, the storage and memory utilized by the source VM is shared with the destination VM (e.g., via a hypervisor). At operation 416 the picture buffer from the source VM is restored into a picture buffer associated with the destination VM. Restoring the picture buffer enables the destination VM to access the video decode state of the existing decoded frames. Upon accessing the picture buffer now restored in virtual memory of the destination VM, the destination VM resumes decoding the video stream at operation 418.

Figure 5:
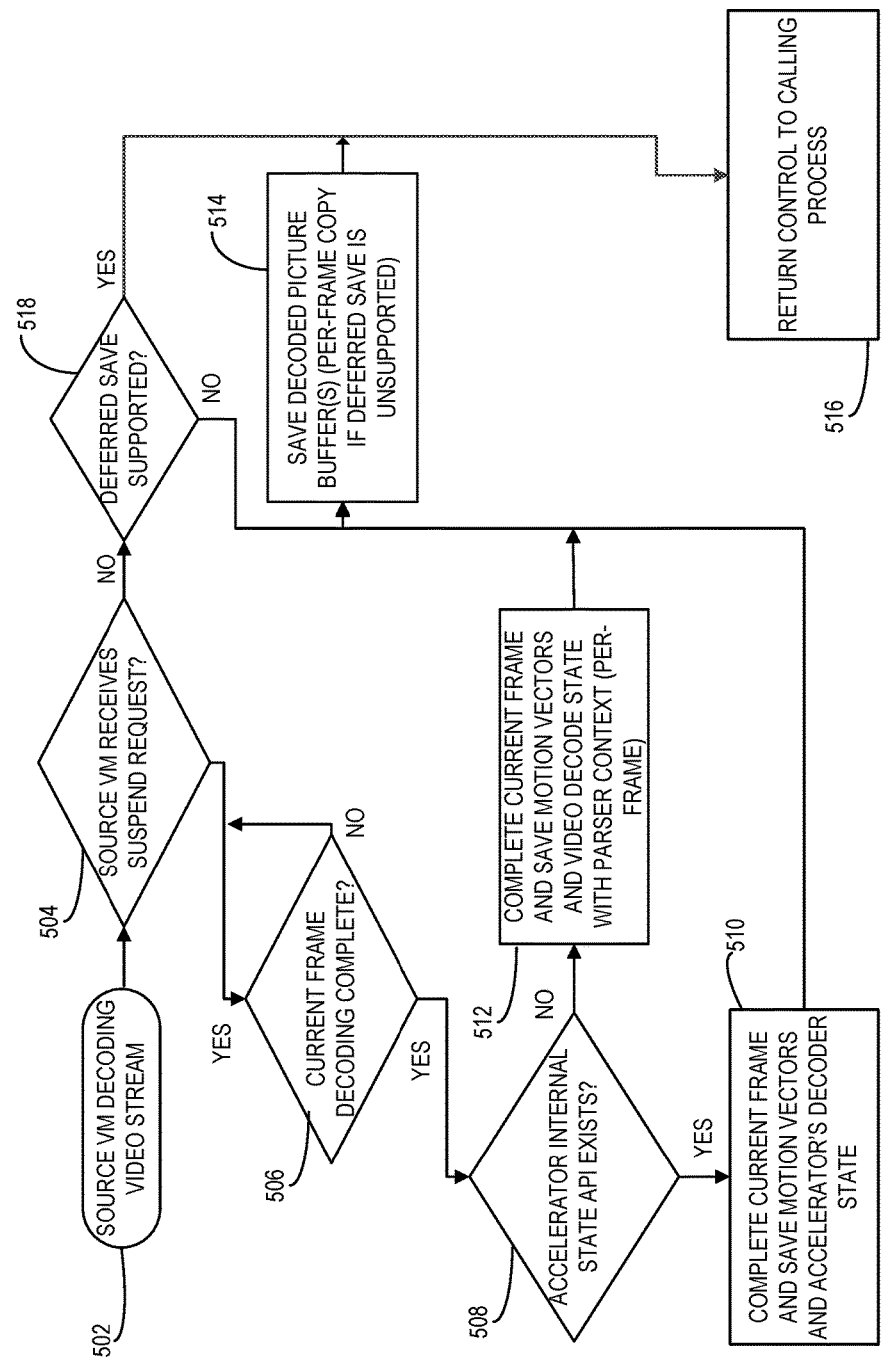
FIG. 5 is a flowchart of an exemplary method of suspending decoding of a video stream on the source VM in anticipation of live migration to the destination VM.

FIG. 5 is a flowchart of a more detailed exemplary method of suspending decoding of a video stream on a source VM in anticipation of live migration to a destination VM. At operation 502, the disclosed system is decoding the video stream on the source VM. During the decoding operations, a request is received to live migrate the video stream at operation 504. If no request is received by the source VM to suspend or otherwise migrate the source VM, then at 518 the process evaluates whether deferred save is supported. If deferred save is supported, then control is returned to the calling process at operation 518. If deferred save is not supported at 518, then the process proceeds to operation 514, described below.

If a suspend or migration request is received at operation 504, then the process moves to operation 506 where the process evaluates whether the decoding of a current frame of the video stream is complete. Although decode operations may be pending for subsequent frames, the process does not begin execution of any decode operations for any subsequent frames once a suspend or live migration request is received. If the decoding of the current frame of the video stream is incomplete then the process loops until the current frame decoding has completed. Subsequently, upon completion of decoding of the current frame, the process evaluates whether an Accelerator Internal State API exists at operation 508. In examples where there is an Accelerator Internal State API available to the software decoder, the software decoder is able to query the video decode state of each frame of the video stream. Otherwise at operation 512 the video decode state, including motion vectors, of each frame are saved with the parser context, thus defining the video decode state.

At operation 510, in examples where the Accelerator Internal State API exists, the pending decode operation for the current frame are completed and the motion vectors and the accelerator's decoder state are stored. The video decode state of each frame is not required to be stored explicitly, as it can be queried or extracted through the Accelerator Internal State API.

In both scenarios, at operation 514 the picture buffer of the source VM is saved. Saving the picture buffer includes reading the contents of each frame stored in the picture buffer to a guest specific system memory location. In some examples, picture parameter set (PPS), sequence parameter set (SPS), Motion Vectors, Picture Order Count, Reference Frame Flags, Weighted Prediction Variants, Macroblock Field Flags, and Host Video Decode Accelerator metadata are linearized before saving to the guest specific system memory location.

In the example of live migration, that guest specific system memory data is migrated to the destination VM. If the source VM is merely suspended/resumed, then the guest specific system memory location is available to the source VM upon resumption. At operation 516, control is returned to the calling process.

Figure 6:
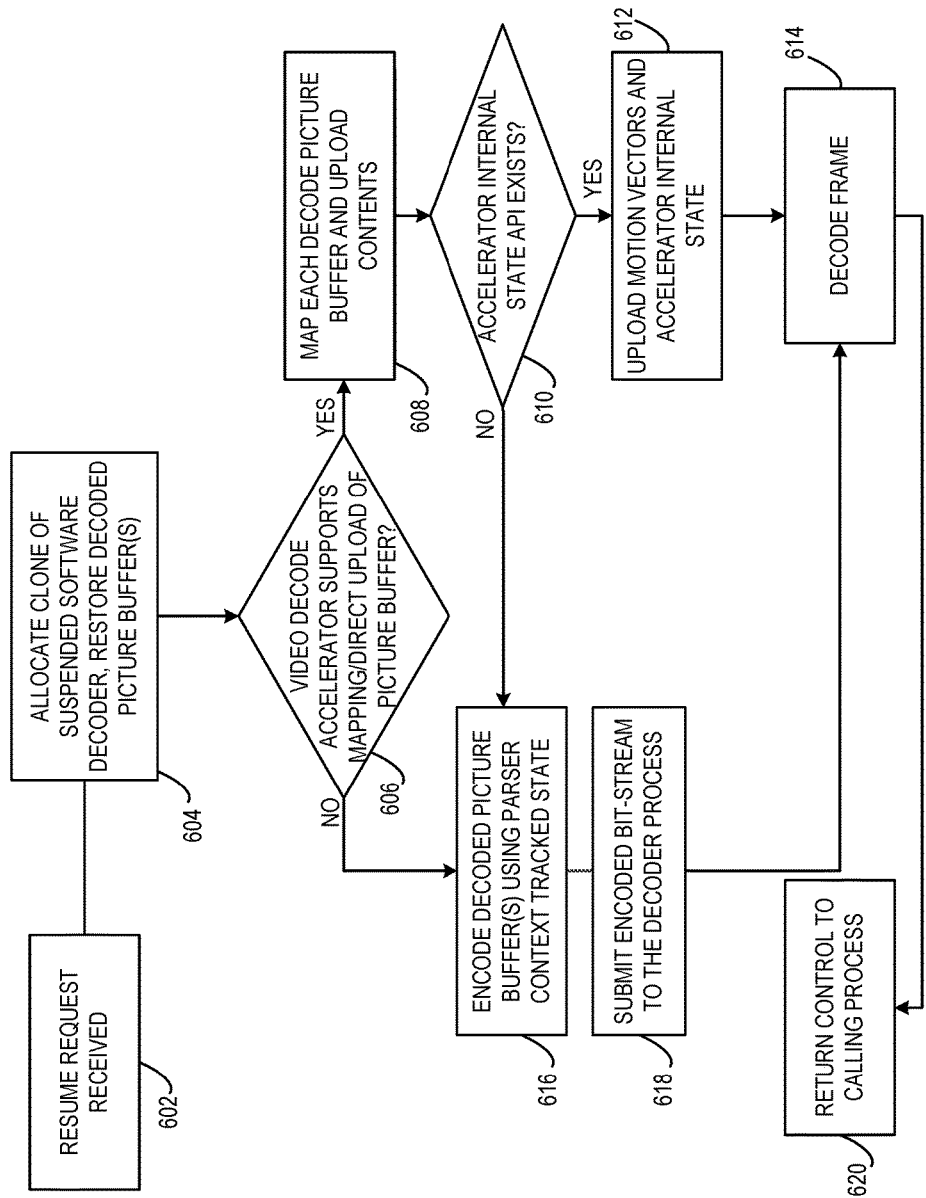
FIG. 6 is a flowchart of an exemplary method of resuming decoding of a video stream on the destination VM after live migration to the destination VM.

FIG. 6 is a flowchart of an exemplary method of resuming decoding of a video stream on a destination VM after live migration to the destination VM.

At operation 602 a resume request is received, instructing the destination VM to resume decoding of the video stream. At operation 604 a video decode accelerator is initialized by creating a clone of the suspended software decoder, allocated on the destination VM. Also, one or more picture buffers are restored to virtual memory associated with the destination VM. In some examples the picture buffers are read into virtual memory of the destination VM from a memory shared by both the source and destination VM. In other examples, the picture buffer is explicitly migrated from virtual memory associated with the source VM to virtual memory associated with the destination VM. New instances of the video decode accelerator may require an initial re-encoded I-frame. Restoring the contents of the picture buffer includes restoring reference frame flags of each decoded picture buffer from a guest specific system memory location to their original index in the decoded picture buffer list.

At 606 if the video decode accelerator supports mapping or direct upload of a picture buffer, then each decoded picture buffer is mapped and its contents uploaded by the process at operation 608. At operation 610 the process evaluates whether an Accelerator Internal State API exists on the destination VM. As with the source VM, the Accelerator Internal State API exposes the internal state of various decoded frames in the picture buffer. If the Accelerator Internal State API does exist on the destination VM, then the motion vectors and accelerator internal state are uploaded at operation 612. The uploaded or restored state includes, in some examples, the PPS, SPS, motion vectors, picture order count, weighted prediction variants, reference frame flags, macroblock field flags, and host video decode accelerator metadata.

If the destination VM cannot leverage an Accelerator Internal State API at 610, or if the video decode accelerator does not support map/upload at 606, then the decoded picture buffers are encoded using the parser context (described in more detail in FIG. 8) at operation 616. The encoded bit-stream is then submitted to the decoder process at operation 618.

At 614, whether an Accelerator Internal State API was leveraged at operation 612, or whether the decoder picture buffer map/upload was supported at 606, the process resumes decoding frames in the video stream. Upon completion of decoding the frames control is returned to the calling process at 620.

Figure 7:
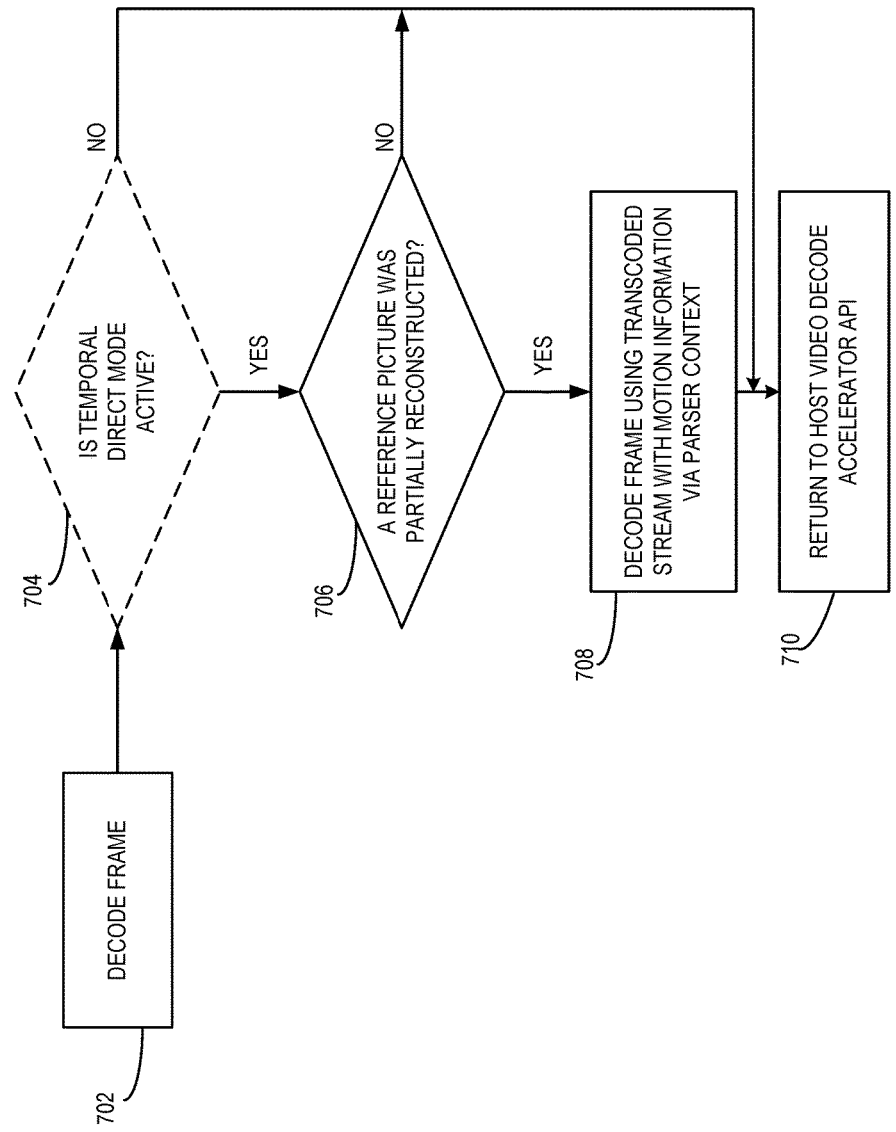
FIG. 7 is a flowchart of an exemplary method of resuming decoding of a first video frame in the video stream after live migration to the destination VM.

FIG. 7 is a flowchart of an exemplary method of resuming decoding of a first video frame in the video stream after live migration to the destination VM. At operation 702, the process receives the first instruction to decode the first frame after resumption of decoding on the destination VM. In some examples, at 704 the process evaluates whether an implicit state was required for decoding the frame (e.g. Temporal Direct Mode). Temporal Direct Mode is a mode in some video encoding standards where no motion vector is transmitted for a B-slice macro block or partition encoded in direct mode. Consequently, Temporal Direct Mode lacks explicit motion vector information for B-slices. To support Temporal Direct Mode, the picture order count must be sufficiently restored to construct an accurate temporal scale value and to construct the motion vectors for each reference frame.

The process evaluates whether a reference frame, uploaded from the picture buffer, was partially or fully reconstructed at operation 706 (e.g., in the example of a B-slice macroblock using Temporal Direct Mode, the reference frame is not fully reconstructed). If the reference frame is only partially reconstructed, video decode state information is parsed out of the compressed buffer and stored in the parser context as it comes in per frame, and reintroduced through the transcoded stream at operation 708. In some examples where the reference frame is fully reconstructed, the software decoder of the destination VM, via the Accelerator Internal State API, reveals the internal state (e.g. any applicable metadata and video decode state information). The available internal state data is conveyed via the parser context from the source VM onto the destination VM, where the destination VM explicitly assigns it into the decode process. If there is an Accelerator Internal State API on either the source VM or destination VM, the necessary internal state data is retrievable by either the source or destination VM into the parser context. Transcoding overhead is not incurred when an Accelerator Internal State API is available for both the source VM and the destination VM.

Otherwise, the reference frames are transcoded because they do not have sufficient reconstruction. In the absence of an Accelerator Internal State API on either the source or destination VM, the implicit state that was originally intended for the reference picture contribution into the current decode frames bitstream is introduced through a transcode. As a result, the current decode frame's bitstream does not rely upon implicit state. It relies on explicit state that is supplied in the transcoded stream, thus restoring the ability to run on an arbitrary decode process which may or may not have the implicit state calculated.

In the example where transcoded streams are utilized, there is no internal state data from the Accelerator Internal State API to determine the video decode state of a specific frame. An example of a partially reconstructed frame occurs when the contents are there to be uploaded but the original motion vectors, the original macro block field flags, weighted prediction variants, and the picture order count that were the original intended contents of the picture cannot be uploaded.

At operation 708, the next frame to be decoded is processed by leveraging the information parsed out of all the previous decode frames and retained in the parser context. The incoming stream is transcoded into the decode frame to include information required to make explicit assignment of the video decode state that was not present in the incoming video stream, with its implicit video decode state reference. The implicit video decode state that was utilized by the optimization for the current video stream is then explicitly assigned by the parser context and transcoder to restore the video decode state as it was intended for the decode process, initialized by the host video decode acceleration API at 710.

Figure 8:
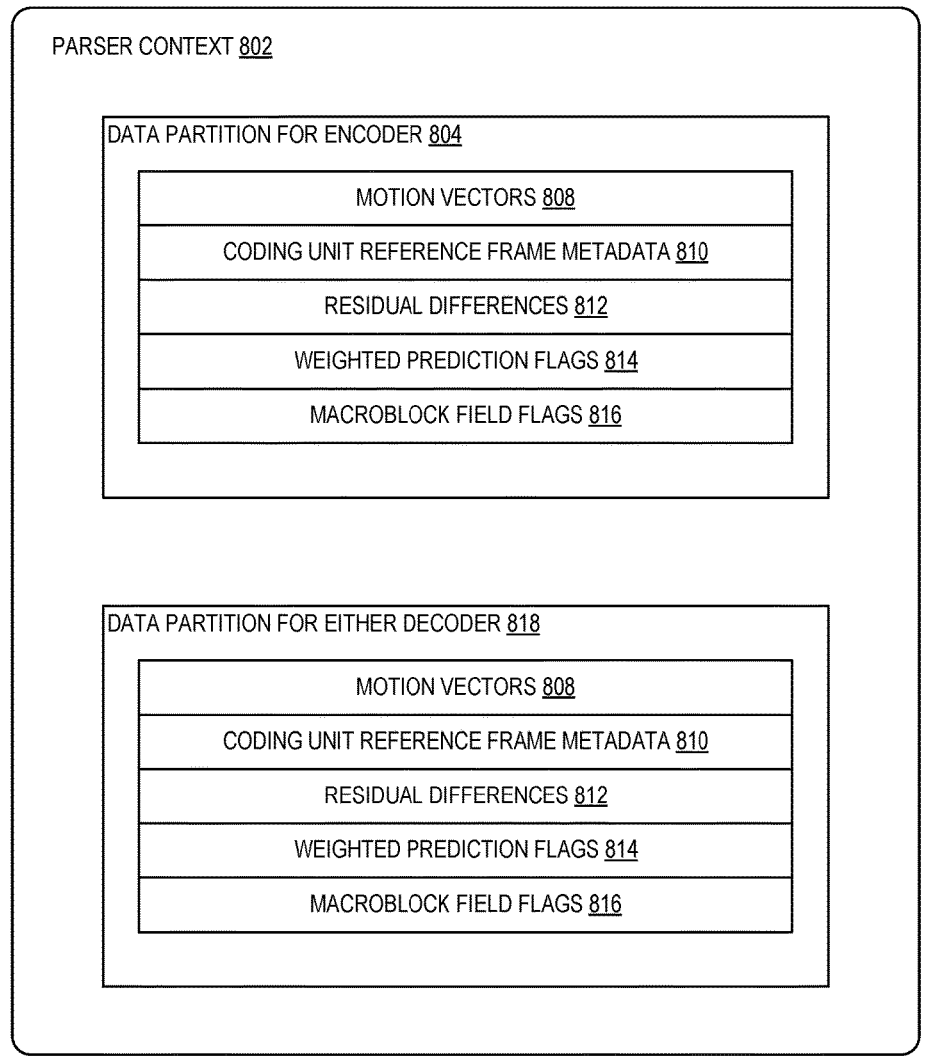
FIG. 8 is a block diagram of a parser context utilized in decoding video frames in the video stream at both the source virtual machine and the destination VM.

FIG. 8 is a block diagram of a parser context utilized in decoding video frames in the video stream at both the source VM and the destination VM. The parser context 802 includes a data partition for either the encoder 804 or decoder 818. As the decode frames come in, the parser context 802 retains the information for each frame such as the motion vectors 808, the coding unit reference frame metadata 810 (slice data reference picture indices in some examples), residual differences 812, weighted prediction flags 814, and macroblock field flags 816. In some examples the parser context 802 relies upon the macroblocks and known information to derive or calculate other data such as motion vectors 808. Once it has the calculated motion vectors 808, it reintroduces those in the encoder data partition 818.

Figure 9:
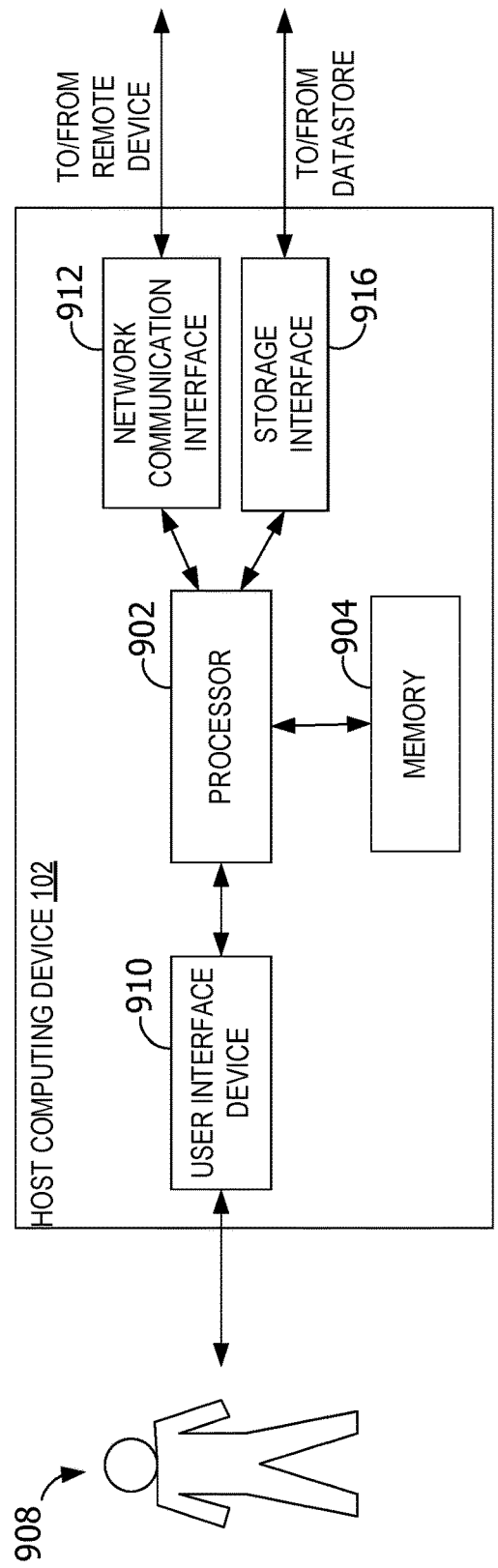
FIG. 9 is a block diagram of an exemplary host computing device.

FIG. 9 is a block diagram of an example host computing device 102. Host computing device 102 includes a processor 902 for executing instructions. In some examples, executable instructions are stored in a memory 904. Memory 904 is any device allowing information, such as executable instructions and/or other data, to be stored and retrieved. For example, memory 904 may include one or more random access memory (RAM) modules, flash memory modules, hard disks, solid state disks, and/or optical disks.

Host computing device 102 may include a user interface device 910 for receiving data from a user 908 and/or for presenting data to user 908. User 908 may interact indirectly with host computing device 102 via another computing device such as a device running VMware's vCenter Server or other management device. User interface device 910 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 910 operates to receive data from user 908, while another device (e.g., a presentation device) operates to present data to user 908. In other examples, user interface device 910 has a single component, such as a touch screen, that functions to both output data to user 908 and receive data from user 908. In such examples, user interface device 910 operates as a presentation device for presenting information to user 908. In such examples, user interface device 910 represents any component capable of conveying information to user 908. For example, user interface device 910 may include, without limitation, a display device (e.g., a liquid crystal display (LCD), organic light emitting diode (OLED) display, or "electronic ink" display) and/or an audio output device (e.g., a speaker or headphones). In some examples, user interface device 910 includes an output adapter, such as a video adapter and/or an audio adapter. An output adapter is operatively coupled to processor 902 and configured to be operatively coupled to an output device, such as a display device or an audio output device.

Host computing device 102 also includes a network communication interface 912, which enables host computing device 102 to communicate with a remote device (e.g., another computing device) via a communication medium, such as a wired or wireless packet network. For example, host computing device 102 may transmit and/or receive data via network communication interface 912. User interface device 910 and/or network communication interface 912 may be referred to collectively as an input interface and may be configured to receive information from user 908.

Host computing device 102 further includes a storage interface 916 that enables host computing device 102 to communicate with one or more data storage devices, which store virtual disk images, software applications, and/or any other data suitable for use with the methods described herein. In some examples, storage interface 916 couples host computing device 102 to a storage area network (SAN) (e.g., a Fibre Channel network) and/or to a network-attached storage (NAS) system (e.g., via a packet network). The storage interface 916 may be integrated with network communication interface 912.

Figure 10:
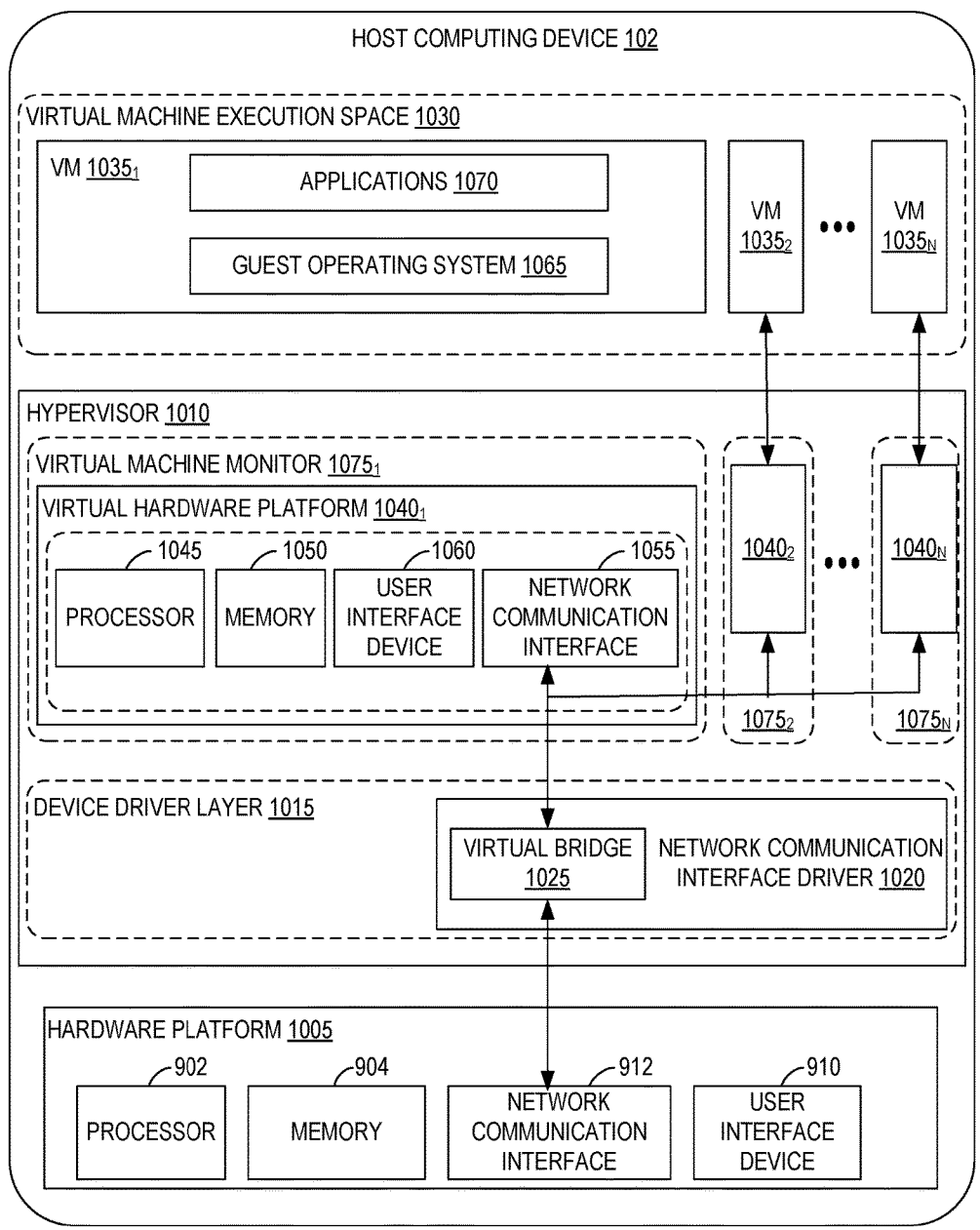
FIG. 10 is a block diagram of virtual machines that are instantiated on a computing device, such as the host computing device shown in FIG. 9.

FIG. 10 depicts a block diagram of virtual machines $1035_1$, $1035_2$ . . . $1035_N$ that are instantiated on host computing device 102. Host computing device 102 includes a hardware platform 1005, such as an x86 architecture platform. Hardware platform 1005 may include processor 902, memory 904, network communication interface 912, user interface device 910, and other input/output (I/O) devices, such as a presentation device. A virtualization software layer, also referred to hereinafter as a hypervisor 1010, is installed on top of hardware platform 1005.

The virtualization software layer supports a virtual machine execution space 1030 within which multiple virtual machines (VMs $1035_1$-$1035_N$) may be concurrently instantiated and executed. Hypervisor 1010 includes a device driver layer 1015, and maps physical resources of hardware platform 1005 (e.g., processor 902, memory 904, network communication interface 912, and/or user interface device 910) to "virtual" resources of each of VMs $1035_1$-$1035_N$ such that each of VMs $1035_1$-$1035_N$ has its own virtual hardware platform (e.g., a corresponding one of virtual hardware platforms $1040_1$-$1040_N$), each virtual hardware platform having its own emulated hardware (such as a processor 1045, a memory 1050, a network communication interface 1055, a user interface device 1060 and other emulated I/O devices in VM $1035_1$). Hypervisor 1010 may manage (e.g., monitor, initiate, and/or terminate) execution of VMs $1035_1$-$1035_N$ according to policies associated with hypervisor 1010, such as a policy specifying that VMs $1035_1$-$1035_N$ are to be automatically restarted upon unexpected termination and/or upon initialization of hypervisor 1010. In addition, or alternatively, hypervisor 1010 may manage execution VMs $1035_1$-$1035_N$ based on requests received from a device other than host computing device 102. For example, hypervisor 1010 may receive an execution instruction specifying the initiation of execution of first VM $1035_1$ from a management device via network communication interface 912 and execute the execution instruction to initiate execution of first VM 1035$_1$.

In some examples, memory 1050 in first virtual hardware platform 1040$_1$ includes a virtual disk that is associated with or "mapped to" one or more virtual disk images stored on a disk (e.g., a hard disk or solid state disk) of host computing device 102. The virtual disk image represents a file system (e.g., a hierarchy of directories and files) used by first VM 1035$_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 1015 includes, for example, a communication interface driver 1020 that interacts with network communication interface 912 to receive and transmit data from, for example, a local area network (LAN) connected to host computing device 102. Communication interface driver 1020 also includes a virtual bridge 1025 that simulates the broadcasting of data packets in a physical network received from one communication interface (e.g., network communication interface 912) to other communication interfaces (e.g., the virtual communication interfaces of VMs 1035$_1$-1035$_N$). Each virtual communication interface for each VM 1035$_1$-1035$_N$, such as network communication interface 1055 for first VM 1035$_1$, may be assigned a unique virtual Media Access Control (MAC) address that enables virtual bridge 1025 to simulate the forwarding of incoming data packets from network communication interface 912. In an example, network communication interface 912 is an Ethernet adapter that is configured in "promiscuous mode" such that all Ethernet packets that it receives (rather than just Ethernet packets addressed to its own physical MAC address) are passed to virtual bridge 1025, which, in turn, is able to further forward the Ethernet packets to VMs 1035$_1$-1035$_N$. This configuration enables an Ethernet packet that has a virtual MAC address as its destination address to properly reach the VM in host computing device 102 with a virtual communication interface that corresponds to such virtual MAC address.

Virtual hardware platform 1040$_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 1065 in order to execute applications 1070 for an instantiated VM, such as first VM 1035$_1$. Virtual hardware platforms 1040$_1$-1040$_N$ may be considered to be part of virtual machine monitors (VMM) 1075$_1$-1075$_N$ that implement virtual system support to coordinate operations between hypervisor 1010 and corresponding VMs 1035$_1$-1035$_N$. Those with ordinary skill in the art will recognize that the various terms, layers, and categorizations used to describe the virtualization components in FIG. 10 may be referred to differently without departing from their functionality or the spirit or scope of the disclosure. For example, virtual hardware platforms 1040$_1$-1040$_N$ may also be considered to be separate from VMMs 1075$_1$-1075$_N$, and VMMs 1075$_1$-1075$_N$ may be considered to be separate from hypervisor 1010. One example of hypervisor 1010 that may be used in an example of the disclosure is included as a component in VMware's ESX brand software, which is commercially available from VMware, Inc.

ADDITIONAL EXAMPLES

The following examples are merely illustrative of the described functions, and should not be interpreted as limiting in any way.

Below are examples of methods of explicit specification of the Picture Order Count for a Video Decode Acceleration API in an H.264 environment:

API submission of an H.264 encoded stream including a Slice Header with ref_pic_list_reordering_flag, which explicitly programs the Picture Order Count for an accelerator.

API submission of an H.264 encoded stream including a specialized SPS where pic_order_cnt_type equals 0 and pic_order_cnt_lsb is specified in the stream and explicitly programs the picture order count for an accelerator's view of the decoded picture. This method assumes reconstruction of the Picture Order Count MSB is not needed to represent the delta between any arbitrary frame reference and the current frame.

API submission of an H.264 encoded stream including a specialized SPS where pic_order_cnt_type equals 1 and delta_pic_order cnt[ . . . ] is specified, thus programming the accelerator's view of the Picture Order Count for the decoded picture. This method assumes a known Picture Order Count (e.g., default process values).

DXVA H.264 decode accelerator instance where specifying DXVA_PicParams_H264.FieldOrderCntList explicitly programs the Picture Order Count without bias.

An H.264 Video Decode Acceleration API utilizing a lookaside Picture Parameter Buffer that can be used to explicitly program the Picture Order Count without bias.

Exemplary methods of explicit specification of the Motion Vectors are as follows for a Video Decode Acceleration API in an H.264 environment:

API submission of an H.264 encoded stream including a Motion Vector data, which explicitly programs without bias the Motion Vectors for an accelerator's view of the video stream's macroblocks.

An H.264 Video Decode Acceleration API, which allows for the explicit specification of Motion Vectors for a Decoded Picture Buffer without bias.

Exemplary methods of explicit specification of Host Video Decode Accelerator metadata are as follows for a Video Decode Acceleration API in an H.264 environment:

DXVA H.264 decode accelerator instance where a program can specify one or more of the following buffer types to restore Host Video Decode Accelerator metadata: DXVA2_ConfigPictureDecode, DXVA2__SliceControlBufferType, DXVA2_MacroBlockControlBufferType, DXVA2_MotionVectorBuffer.

An H.264 Video Decode Acceleration API, which allows for API specific Host Video Decode Accelerator metadata to be explicitly specified through one or more function calls to the API.

Weighted Prediction builds upon the calculated Motion Vectors for macroblock prediction. In explicit mode, the weighting factor(s) are determined by the encoder and transmitted in the slice header. In implicit mode, a weight[0] and a weight[1] are calculated based upon the relative temporal location of the current frame, with regards to the list 0 and list 1 reference frames respectively. The temporal location of the current frame and its reference frames is reconstructed, in some examples, through explicit specification of the Picture Order Counts. For the purposes of "Suspend/Resume", the Motion Vectors and metadata are restored for a Host Video Decode Accelerator. To do so, in some examples the Weighted Prediction Variants are explicitly specified through the Video Decode Acceleration API.

Exemplary methods of explicit specification of Weighted Prediction Variants are as follows for a Video Decode Acceleration API in an H.264 environment:

API submission of an H.264 encoded stream including a Slice Header, which will explicitly program the Weighted Prediction Variants for an accelerator.

DXVA H.264 decode accelerator instance where the DXVA_Slice_H264_Long structure specifies weights.

An H.264 Video Decode Acceleration API, which allows for explicit specification of the Weighted Prediction Variants through one or more function calls to the API.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or the like. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or the like in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein in FIGS. 1 and 2 as well as embodiments not specifically described herein but within the scope of aspects of the disclosure constitute exemplary means for live migration of a VM decoding a video stream. The transcoder disclosed in FIGS. 1 and 2 is an exemplary means of extracting the video decode state and re-encoding it to leverage the implied state of a partially reconstructed frame. The system as disclosed in FIGS. 1 and 2 leverages the dedicated host video decode resources, such as the GPU, available on a host computing device to more efficiently suspend and resume the video stream.

Some examples of the disclosure may be implemented with containers, rather than VMs. In these examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both.

For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for live migration of a video stream, said system comprising:
   a memory area associated with a computing device, said memory area storing a source virtual computing instance (VCI) and a picture buffer; and
   a processor programmed to:
      in response to receiving a request to perform live migration of the source VCI to a destination VCI, the source VCI decoding the video stream comprising a plurality of video frames:
      complete any pending frame decode operation and suspending execution of any new frame decode operations, thereby defining at least a portion of a video decode state;
      store the video decode state in the picture buffer of the source VCI;
      perform migration of the source VCI to the destination VCI, including copying the picture buffer of the source VCI to a picture buffer of the destination VCI;
      restore, on the destination VCI, the video decode state from the picture buffer of the destination VCI; and
      resume decode operations for the video stream on the destination VCI using the restored video decode state.

2. The system of claim 1, wherein the picture buffer is stored in virtual memory of the source VCI.

3. The system of claim 1, wherein restoring at least one video decode state is performed via a host video decode acceleration application programming interface (API).

4. The system of claim 1, wherein the video stream at the destination VCI comprises the picture buffer of decoded video frames, the video decode state, and associated motion.

5. The system of claim 1, wherein the processor is programmed to decode the video stream in temporal direct mode.

6. The system of claim 1, wherein the processor is programmed to extract, at the destination VCI, the video decode state and store the video decode state in a parser context.

7. The system of claim 6, wherein the processor is programmed to use the video decode state stored in the parser context to decode a B-slice macroblock.

8. A computer-implemented method of live migration from a source virtual computing instance (VCI) decoding a video stream to a destination VCI, the method comprising:
   receiving by the source VCI a request to migrate to a destination VCI, the source VCI decoding a video stream comprising a plurality of video frames;
   completing any pending frame decode operations and suspending execution of any new frame decode operations, thereby defining at least a portion of a video decode state;
   storing the video decode state in a picture buffer of the source VCI;
   performing migration of the source VCI to the destination VCI, including copying the picture buffer of the source VCI to a picture buffer of the destination VCI;
   restoring, at the destination VCI, the video decode state from the picture buffer of the destination VCI; and
   resuming decode operations of the video stream on the destination VCI using the restored video decode state.

9. The method of claim 8, wherein performing migration further comprises pausing decoding of the video stream at the source VCI at a granularity of a virtual processor instruction.

10. The method of claim 8, wherein receiving the request to migrate occurs while the video stream is being decoded by the source VCI.

11. The method of claim 8, wherein the video decode state further comprises at least one of a decoded picture buffer metadata, a coding unit metadata, or a macroblock data.

12. The method of claim 8, wherein restoring the video decode state comprises restoring the video decode state from the picture buffer associated with the destination VCI that has been populated with data from the picture buffer associated with the source VCI.

13. The method of claim 8, wherein the source VCI executes on a host computing device, and wherein decoding of the video stream is performed by a graphics processing unit (GPU) on the host computing device.

14. The method of claim 8, wherein restoring the video decode state occurs via a host video decode acceleration application programming interface (API).

15. The method of claim 8, wherein resuming decode operations comprises uploading decoded frames to the picture buffer and submitting encoded picture groups to an encoder.

16. A non-transitory computer readable storage medium having stored thereon computer-executable instructions which include program code executable by a computer system, the program code embodying a method comprising:
   in response to receiving a request to perform a live migration of a source virtual computing instance (VCI) to a destination VCI, the source VCI decoding a video stream comprising a plurality of video frames:
      completing any pending decode operations and suspending execution of any new decode operations, thereby defining at least a portion of a video decode state;
      storing the video decode state in a picture buffer of the source VCI;

migrating the source VCI to the destination VCI, including copying the picture buffer of the source VCI to a picture buffer of the destination VCI;

restoring, at the destination VCI, the video decode state from the picture buffer of the destination VCI; and resuming decode operations of the video stream on the destination VCI using the restored video decode state.

17. The non-transitory computer readable storage medium of claim 16, wherein restoring the video decode state is performed via a host video decode acceleration application programming interface (API).

18. The non-transitory computer readable storage medium of claim 16, wherein the computer-executable instructions further include program code to decode the video stream in temporal direct mode.

19. The non-transitory computer readable storage medium of claim 16, wherein the computer-executable instructions further include program code to extract the video decode state and store the extracted video decode state in a parser context.

20. The non-transitory computer readable storage medium of claim 19, wherein the computer-executable instructions further include program code to use the video decode state stored in the parser context to decode a B-slice macroblock.

* * * * *